United States Patent [19]
Edwards et al.

[11] Patent Number: 5,512,370
[45] Date of Patent: Apr. 30, 1996

[54] POLYOLEFIN-EXTRUSION COATING COMPOSITIONS HAVING GOOD COATABILITY, GOOD ADHESION TO THE SUBSTRATE, AND GOOD CHILL ROLL RELEASE

[75] Inventors: Ray Edwards, Henderson; Bruce W. Foster, Longview, both of Tex.

[73] Assignee: Eastman Chemical Company, Kingsport, Tenn.

[21] Appl. No.: 384,905

[22] Filed: Feb. 7, 1995

Related U.S. Application Data

[62] Division of Ser. No. 115,271, Aug. 31, 1993, Pat. No. 5,387,630.

[51] Int. Cl.$^6$ .......................... B32B 15/08; B32B 27/02; B32B 27/08; B32B 27/10
[52] U.S. Cl. .......................... 428/373; 428/375; 428/378; 428/394; 428/461; 428/500; 428/509; 428/511; 428/512; 428/513; 428/537.5

[58] Field of Search ................ 524/232; 428/537.5, 428/509, 511, 512, 513, 373, 394, 375, 378, 461, 500

[56]  References Cited

U.S. PATENT DOCUMENTS

| | | | |
|---|---|---|---|
| 4,526,919 | 7/1985 | Edwards | 524/232 |
| 5,112,424 | 5/1992 | Cook. | |
| 5,114,763 | 5/1992 | Brant et al. | 428/34.9 |
| 5,326,627 | 6/1994 | Yazaki et al. | 428/216 |

*Primary Examiner*—Ana L. Carrillo
*Attorney, Agent, or Firm*—Mark A. Montgomery; Harry J. Gwinnell

[57]  ABSTRACT

Disclosed is a novel polyethylene composition that is a blend of a polyethylene component having defined properties, a specific quantity of a defined tackifying resin and a very specific minute quantity of a unique amide of a fatty acid. The novel composition can be used in a process for extrusion coating at high speeds and relatively low extrusion coating temperatures with good adhesion to the substrate and dramatically improved chill roll release.

17 Claims, 1 Drawing Sheet

POLYOLEFIN-EXTRUSION COATING COMPOSITIONS HAVING GOOD COATABILITY, GOOD ADHESION TO THE SUBSTRATE, AND GOOD CHILL ROLL RELEASE

This is a divisional application of copending application Ser. No. 08/115,271 filed Aug. 31, 1993, now U.S. Pat. No. 5,387,630.

FIELD OF THE INVENTION

This invention relates to polyethylene compositions useful for low temperature extrusion coating. The present invention also relates to extrusion coating processes that are conducted at relatively low temperatures and fast line speeds that provide good adhesion to the substrate and good chill roll release.

BACKGROUND OF THE INVENTION

Extruding a coating of a polyolefin or blends of polyolefins onto a substrate, such as paper or aluminum foil, to form an extrusion coated substrate, is well known in the art. Extruding multiple layers of polymers including polyolefins as well as other materials in a process known as co-extrusion is also well known. Various polyethylenes and blends of polyethylenes have been used widely as extrusion coating compositions. Such materials have also been used in coextrusion processes as the layer against the substrate so as to adhere the coating to the substrate. Unfortunately, the use of polyethylene-based coatings has several drawbacks. For example, such materials frequently lack the desired level of adhesion to typical extrusion coated substrates, especially when extrusion coating is carried out at low temperatures and/or at extremely high coating speeds. In addition, polyethylene-based coatings typically require extrusion coating temperatures that generate excessive odor and are not compatible, in co-extrusions, with some heat sensitive polymers.

Low temperature extrusion coating processes are useful when applying coextrusions with other polymers which are temperature sensitive. Low temperature extrusion coating processes are also useful when employing substrates which are temperature sensitive. Low temperature extrusion coating processes are also useful when applying polymeric coatings which contain additives which are temperature sensitive. Standard extrusion coating materials, particularly, polyethylene employed at low extrusion temperatures, are not capable of adhering to the substrate with the desired degree of adhesion.

High extrusion coating speeds are desirable so as to enable economically attractive operation of extrusion coating equipment. High extrusion coating speeds are also desirable so as to permit the preparation of very thin extrusion coatings.

Attempts to improve the adhesion to the substrate and coating speeds for extrusion and coextrusion are disclosed in U.S. Pat. No. 5,112,424, copending application Ser. No. 578,036 filed Sept. 5, 1990, and copending application Ser. No. 681,801 filed Apr. 5, 1991. These compositions and processes improve the adhesion of particular polyethylene compositions to the substrate by the addition of particular tackifying resins. To accomplish this good adhesion to the paper substrates, a high loading of up to 15 weight percent of tackifier is sometimes required. The tackifier, while promoting adhesion to the substrate, also increases the adhesion to the chill roll surface in extrusion coating operations, particularly when using a high gloss chill roll surface. The adhesion to the chill roll provides poor chill roll release. Sometimes the adhesion forces between the tackified composition and the chill roll exceed the adhesion forces between the tackified composition and substrate, and the polyethylene is pulled away from the substrate as the coated structure is pulled from the chill roll surface. Sometimes the adhesion force between the tackified polyethylene composition and substrate are so high that a destructive bond at the interface is formed while adhesion forces between the tackified polyethylene composition and chill roll are also high resulting in the substrate, when made of paper, being ruptured internally as the coated structure is pulled from the chill roll. In either case, poor bond between the coating and substrate or substrate rupture is undesirable.

U.S. Pat. No. 4,526,919 discloses the use of fatty acid amides containing 16 to 40 carbon atoms as chill roll release agents in polypropylene extrusion coating.

It would be very desirable to be able to reduce the adhesion between the tackified polyethylene composition and chill roll without detracting from the adhesion forces required to bond the polyethylene to the substrate at low temperature extrusion coating. It would also be very desirable to be able to reduce this adhesion to the chill roll while maintaining the polyethylene's good surface qualities such as flame acceptance, corona priming, and heat seal ability.

SUMMARY OF THE INVENTION

The extrusion coating composition of the present invention comprises:

(a) a polyethylene component having a melt index in the range of about 2 up to 100 dg per minute at 190° C. and having a sufficiently broad molecular weight distribution so that the resulting composition is capable of being extrusion coated at a temperature in the range of 175° C. up to 290° C., (b) about 2 to 20 weight percent of a tackifying resin having a ring and ball softening point (RBSP) in the range of about 100° up to 140° C., and (c) about 0.03 to 0.07 weight percent of the fatty acid amide, erucamide.

The process according to the present invention for the low temperature extrusion coating of a substrate with a polyethylene film having a thickness of at least about 0.0075 mm comprises; applying the composition above to at least one surface of a substrate by extrusion coating at a temperature in the range of about 175° to 290° C.

DETAILED DESCRIPTION OF THE INVENTION

Figure 1:
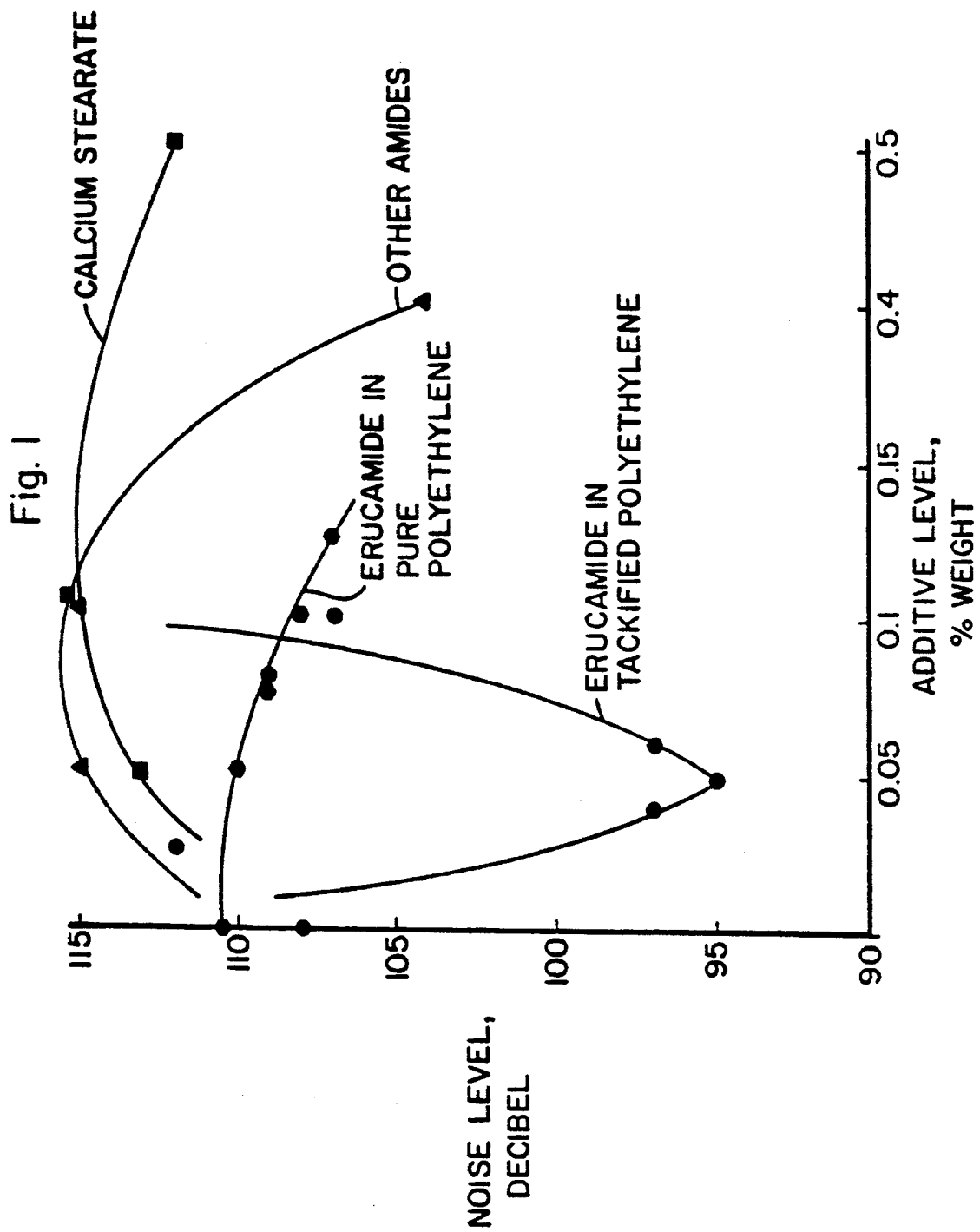
FIG. 1 shows the good chill roll release of the specific amounts of the inventive composition as evidenced by the reduction in noise level in decibels.

The applicants have unexpectedly discovered that a unique fatty acid amide that, when added at a critical level to a unique polyethylene system containing a tackifying resin (tackifier) provides excellent chill roll release without detracting from the adhesion of the polyethylene system to the substrate. Chill roll release is freely obtained with the use of the critical amount of erucamide and the integrity of the surface and structure of the extrusion coated article is maintained.

All of the tackifier-containing compositions described herein tend to exhibit chill roll sticking at all extrusion coating melt temperatures. Chill roll sticking worsens as more tackifier is added. Normally, for hard-finished paper substrates such as clay-coated board and machine-glazed paper, high amounts of tackifier are needed to effect good adhesion between the substrate and polyethylene (about 10% tackifier). At this high loading of tackifier, chill roll sticking is aggravated, and the paper substrates tend to delaminate or rupture internally as the polyethylene coating is peeled from the chill roll during the extrusion coating process.

Unexpectedly, a small, yet critical quantity, of erucamide, between 300 and 700 parts per million (ppm), was found to provide the best chill roll release, better than the lesser amount of 250 ppm and the greater amount of 1,000 ppm, in the presence of tackifier. Surprisingly, other fatty acid amides, and calcium stearate, were totally ineffective as a chill roll release agent for polyethylene in the presence of a tackifier. Also, surprising was the fact that erucamide fails to provide good chill roll release to a pure polyethylene system, i.e. without a tackifier. The tackifier's presence is required for the erucamide to effect good chill roll release for polyethylene, providing a synergistic interaction between tackifier and erucamide.

The erucamide is a 22-carbon unsaturated, primary amide and can be purchased from Humko Chemical under the name of KEMAMIDE E. During the extrusion coating process the erucamide, in combination with polyethylene and tackifier, permits free release of the polyethylene coating from the chill roll at the specified quantities. The amount of erucamide used in the composition of the present invention varies from about 0.03 to 0.07 weight percent, more preferably about 0.04 to 0.06 weight percent with about 0.05 weight percent erucamide being most preferred.

The process according to the present invention for the low-temperature extrusion coating of a substrate with a polyethylene film having a thickness of at least about 0.0075 mm comprises; applying the inventive composition to at least one surface of said substrate by extrusion coating at a temperature in the range of 175° to 290° C. The process according to the present invention is preferably conducted at a temperature of about 200° to 260° C., with a temperature of about 240° to 250° C. being most preferred.

In the process according to the present invention the composition that is extrusion coated onto a substrate also contacts a chill roll and has a sound level at the chill roll release point that is significantly reduced when compared to an identical process and composition except without the presence of the erucamide. This reduction of the sound level at the chill roll release point is at least 5 decibels less, preferably at least 10 decibels less, with a reduction in sound level of at least 15 decibels less being most preferred.

Polyethylene compositions useful in the practice of the present invention are materials having a melt index at 190° C. falling in the range of about 2 up to 100 decigrams per minute. Preferred polyethylene components are materials having a melt index falling in the range of about 20 up to 80 decigrams per minute; with materials having melt index falling in the range of about 30 up to 80 being most preferred.

Polyethylene materials useful in the practice of the present invention are typically low density materials. Polyethylenes having densities in the range of about 0.913 to 0.926 are presently preferred materials.

It is desirable that the polyethylene materials employed in the practice of the present invention have a sufficiently broad molecular weight distribution so that the resulting composition is capable of being extrusion coated at temperatures in the range of about 175° to 290° C. Those of skill in the art recognize that materials of very narrow molecular weight distribution will not be suitable for the desired extrusion coating application, while materials having intermediate, up to very broad molecular weight distributions, will be more suitable for the desired extrusion coating application. Typically, materials employed in the practice of the present invention will have a polydispersity index, i.e., ratio of weight average molecular weight (Mw) to number average molecular weight (Mn), of at least about 7, preferably about 10 to 20 with a polydispersity index of about 12 being most preferred.

It is also desirable that the polyethylene materials employed in the practice of the present invention have a minimum melting point onset temperature of at least about 95° C., as measured by differential scanning calorimetry (DSC). Materials having such melting properties provide excellent handling characteristics for extrusion coating applications.

A DSC curve for an exemplary composition containing polyethylene and tackifier is illustrated in U.S. Pat. No. 5,112,424 the disclosure of which is incorporated herein by reference in its entirety. The composition employed to obtain this DSC curve is a material having a melt index of about 32 dg/min and a density of about 0.92 g/cc. This material was prepared by blending 90 weight % of a low density polyethylene having a melt index of about 20 dg/min with 10 weight % of NIREZ 1135 tackifying resin. The sample has an onset melting point (determined by extrapolation) of 96.1° C., with a peak melting point of about 105° C.

Polyethylene materials useful in the practice of the present invention can be prepared by polymerizing relatively high purity ethylene in a stirred reactor at pressures above about 1,000 atmospheres and temperatures above about 200° C., using a peroxide-type of catalyst, such as, for example, di-tertiarybutyl peroxide. Lower purity ethylene containing inert materials such as methane, ethane, carbon dioxide, and the like, may be introduced into the ethylene feed to control the purity thereof. Publications to which the reader is directed for further general details on the preparation of suitable low density polyethylenes are the test Polythene by Renfrew and Morgan, at pp. 11–17 and the article in Petroleum Refiner (1956) by Thomasson, McKetta and Ponder, found at p. 191.

The tackifying resins useful in the compositions of this invention have Ring and Ball softening points (RBSP) of about 100° to 140° C., more preferably about 125° to 140° C., with a RBSP of about 135° C. being most preferred.

Suitable preferred tackifying resins are the rosin ester resins and the terpene polymers such as the polymeric, resinous materials including the dimers as well as high polymers obtained by polymerization and/or copolymerization of terpene hydrocarbons such as the alicyclic, monocyclic, and bicyclic monoterpenes and their mixtures, including allo-ocimene, carene, isomerized pinene, pinene (e.g. NIREZ (available from Reichhold Chemical), a polymer of β-pinenes), dipentene, terpinene, terpinolene, limonene, terpentine, a terpene cut or fraction, and various other terpenes. Particularly useful resin esters are the amber colored pentaerythritol ester of rosin having an acid number of about 7 to 16 and a Ring and Ball softening point of about 100° C. to 110° C., such as the Zonester family of products available from Arizona Chemical. One such resin is the pentaerythritol ester of tall oil rosin having a Ring and Ball softening point of 100° C. and an acid number of about 11.

The quantity of tackifying resin employed in the invention compositions can vary widely, typically falling within the range of about 2 up to 20 weight percent, based on the weight of the total composition. The coating thickness also influences the required amount of tackifying resin, i.e. the thicker the coating the lower the amount of tackifying resin is needed. Preferred quantities of tackifying resin fall within the range of about 7 up to 15 weight percent with an amount of about 8 to 10 weight percent being most preferred at a coating thickness of about 0.001 inches (0.025 mm). These quantities are preferred because at these levels of tackifier, maximum adhesion per quantity of tackifier added is achieved. Thus, at lower levels of tackifier, reduced adhesion is observed while little added benefit is obtained. With higher levels of tackifier, chill roll release problems are further aggravated.

As noted above, the invention compositions can optionally further contain in the range of about 25 up to 200 parts per million of a transition metal pro-oxidant. Transition metal compounds contemplated for use in the practice of the present invention are salts formed by combining transition metals such as cobalt, manganese, and copper with organic, acids of sufficiently high molecular weight to give salts soluble in the polymer blends employed.

As employed herein, the term "transition metal" is intended to include elements having greater than 8, and less than 18, electrons in the outer shell of the ionic species. Transition metals are thus usually capable of electron transitions between their outer shells. Thus, the variable valency states which result render these elements capable of inducing oxidation reactions. In practice, those transition elements which are highly toxic and/or radioactive are extremely rare and costly, and thus are not normally encountered in industrial use as oxidation catalysts. More typically encountered transition metals whose salts and complexes are useful for such applications include cerium, zinc, copper, silver, nickel, cobalt, iron, manganese, chromium, and vanadium. These elements can be used in the form of such salts as posses an adequate level of solubility in the polymer melt, typically including such forms as stearates, oleates, behenates, miristates, erucates, lineoleates, naphthanates, or complexes such as acetonyl acetates, 8-hydroxyquinolinates, metal amine salt complexes, and the like, as well as mixtures of any two or more thereof.

Preferred quantities of pro-oxidant, when employed, fall in the range of about 100 up to 150 parts per million, based on the total weight of polymer compositions.

In accordance with an alternative embodiment of the present invention, there may further be included in the invention compositions up to about 10 weight percent of a biodegradable organic polymer. Compounds contemplated by the term "biodegradable organic polymer" include polymeric materials which are themselves intrinsically sensitive to direct enzyme chain scission in the presence of microorganisms which occur profusely in the environment. Exemplary materials contemplated by the above definition include polymeric carbohydrates such as corn starch.

When employed, quantities in the range of about 1 up to 10 weight percent of biodegradable organic polymer are typically employed. Preferably, in the range of about 4 up to 6 weight percent of biodegradable organic polymer will be employed.

The compositions of this invention may be prepared in various ways such as dry blending and then passing through a compounding extruder, compounding on a milling roll or in a Banbury mixer or by fusion. Any method whereby the components can be blended together will produce the desired blend. For example, pellets of each polymer can be blended mechanically and the blend then fed to an extruder where it is fused and extruded.

Additives, stabilizers, fillers and the like can be added to the compositions of the present invention. Such materials can be present in the components forming the polymer blend, or may be added when the polymers are blended to form the extrusion coating composition.

A wide variety of additional extrudable compositions are useful in coextruding with the present invention as long as the composition of the present invention is coextruded as the outer layer in contact with the chill roll. Examples of coextrusion compositions include:

polyethylenes having a melt index different than the melt index of said first polyethylene component, polyethylenes having a density different than the density of said first polyethylene component, polyethylenes modified with polymer additives, polypropylene homopolymers, comonomers, copolymers, and terpolymers, optionally modified with polymer additives, polyethylene comonomers, copolymers and terpolymers, including extrudable ionomers, optionally modified with polymer additives, extrudable polymers of higher olefins having in the range of 4 up to 8 carbon atoms, optionally modified with polymer additives, extrudable polyamides, optionally modified with polymer additives, or extrudable polyesters, optionally modified with polymer additives; as well as mixtures of any two or more thereof.

Each of the above coextrusion polymeric compositions can be modified by addition of polymer additives, such as, for example, slip agents, antiblock agents, pigments (organic or inorganic), stabilizers (e.g., thermal, ultraviolet, flame retardants, antioxidants, and the like), starch based additives to impart biodegradability to the composition, fillers, and the like. Such additives can be physically blended with said polymers, chemically incorporated by copolymerization, grafting, or the like, and so forth.

Polypropylene materials contemplated for use in the coextrusion practice of the present invention include polypropylene homopolymer as well as copolymers and terpolymers having incorporated therein such co-monomers as ethylene, maleic anhydride, 1-butene, 1-hexene, 4-methyl-1-pentene, hydroxyethyl methacrylate, acrylic acid, N-vinyl pyrrolidone, and the like, as well as mixtures of any two or more thereof.

Propylene polymers contemplated for use in the coextrusion practice of the present invention also include a predominantly polypropylene-containing polymer backbone which has been further modified by such techniques as grafting with one or more of the co-monomers set forth above.

Polyethylene materials contemplated for use in the coextrusion practice of the present invention include polyethylene homopolymer as well as copolymers and terpolymers having incorporated therein such co-monomers as:
vinyl acetate,
vinyl alcohol,
carbon monoxide
maleic anhydride,
ethyl methyl acrylate,
ethyl ethyl acrylate,
ethyl methyl pentene, or
ethyl acrylic acid,
and the like, as well as mixtures of any two or more thereof. As in the case with propylene-containing polymers, ethylene polymers contemplated for use in the practice of the present invention include a predominantly ethylene-containing polymer backbone which has been further modified by such techniques as grafting with one or more of the co-monomers set forth above.

Polymers of higher olefins contemplated for use in coextrusion practice of the present invention include poly(1-butene), poly(4-methyl-1-pentene), and the like.

Polyesters contemplated for use in the coextrusion practice of the present invention include polyethylene terephthalate (PET), polybutylene terephthalate (PBT), polycyclohexanedimethanol terephthalate (PCT), and the like, as well as co-polyesters thereof.

Extrusion coating and multi-layer extrusion coating processes are well known in the art and are well within the skill of the artisan. See, for example, U.S. Pat. No. 4,152,387, incorporated by reference in its entirety. Those of skill in the art can readily apply the compositions disclosed herein to such processes.

The laminate structure produced in the coextrusion process can have the first polyethylene-containing component present as the substrate contact layer, as the exterior barrier layer, or, where two or more polymeric materials are coextruded with the polyethylene-containing composition, the polyethylene layer can be positioned as an adhesive tie-layer between the two or more additional extrudable compositions.

Substrates contemplated for use in the practice of the present invention include papers, paperboards, fibers, polymeric materials, metal foils, and the like. Polymeric substrates include polyolefins or ethylene-vinyl alcohol copolymers or functionally-modified derivatives thereof, polyamides or functionally modified polyamides, and the like.

The invention compositions, upon application to substrate by extrusion coating techniques, form a destructive bond, i.e., the substrate-coating bond is sufficiently strong that efforts to separate the coating from the substrate cause destruction of either the coating or the substrate.

This invention can be further illustrated by the following examples of preferred embodiments thereof, although it will be understood that these examples are included merely for purposes of illustration and are not intended to limit the scope of the invention unless otherwise specifically indicated.

EXAMPLES

The following examples show the criticality of a unique fatty acid amide, erucamide, in effecting good chill roll release for a tackifier-modified polyethylene in the extrusion coating process. The erucamide is compared to other additives: stearyl erucamide, behenamide, oleamide, stearamide, and calcium stearate.

The examples were extrusion coated under the following conditions:

| | |
|---|---|
| Chill Roll Surface Finish | 4 to 6 rms (micro-inches) |
| Extrudate Temperature | Shown for Each Example |
| Die Opening | 0.020-inch |
| Die Width | 32-inch |
| Extrusion Output Rate | 16-lb/hr/inch of die width |
| Die-to-Nip Distance | 5-inch |
| Laminator Speed | Shown for Each Example |

All other conditions, unless noted, were essentially the same for all examples.

In the extrusion coating process, as a polymeric coating is pulled from the metal chill roll, the sound intensity (chatter) generated at the release point is an indication of chill roll release. The lower the sound level, the better the chill roll release. A high sound level can also indicate substrate rupture and/or weak adhesion between polymer and substrate.

During the extrusion coating of each example, sound level, monitored in decibels (dB), was measured at the chill roll release point using a Sound Level Meter, Model 1565-B, manufactured by General Radio, USA. In each case, the sound meter was set to "A" scale intensity to monitor the quality of chill roll release.

EXAMPLE 1:

A 32-melt index polyethylene having a density of 0.916-g/cc and a polydispersity index of about 12, available from Eastman Chemical Co. (ECC) as TENITE 811A, containing 10 percent by weight of a tackifier, NIREZ 1135, was used to extrusion coat a paper substrate (40-lb bleached Kraft Paper) with the following observations:

| | |
|---|---|
| Extrudate Temperature | 469° F. (243° C.) |
| Sound Level | 108-dB |
| Adhesion to Substrate | Good (Fiber Tear) |
| Substrate Integrity | Ruptured Internally |
| Wrapped Chill Roll at | 650-fpm (197-m/min) |

This example shows the problems caused by the presence of a tackifier in the extrusion coating of a polyethylene system. While adhesion to the substrate was excellent, the internal rupturing of the substrate made the product unfit for use. Chill roll sticking was noted by the high sound level of 108-dB.

EXAMPLE 2:

A 2.5-melt index pure polyethylene having a density of 0.926-g/cc was modified with five (5) levels of Humko Chemical's erucamide (Humko is a division of Witco). Each modification was extrusion coated to the same Kraft paper substrate at an extrudate temperature of 600° F. (315° C.). Coating speed was 400-fpm (121--m/min). The following were observed:

| Erucamide Level | Sound Level |
|---|---|
| 0% | 111-dB |
| 0.05% | 110-dB |
| 0.075% | 109-dB |
| 0.10% | 108-dB |
| 0.125% | 107-dB |

The addition of erucamide to a pure polyethylene system, i.e., one without a tackifier, provides some minor, but insignificant improvement in chill roll release. One would conclude from this example that erucamide, as a single additive, contributes little to the chill roll release of a pure, otherwise unmodified, polyethylene system.

EXAMPLE 3:

The polyethylene, of Example 1, containing the tackifier was modified with five (5) levels of erucamide. Each modification was extrusion coated to a paper substrate at an extrudate temperature of 470° F. (243° C.). The following observations were noted:

| Erucamide Level | Sound Level | Comments |
| --- | --- | --- |
| 0% | 108-dB | Stuck to Chill Roll at 650-fpm. Substrate ruptured internally. |
| 0.025% | 112-dB | Paper ruptured. No chill roll wrap. |
| 0.04% | 97-dB | Adhesion good. Substrate intact. |
| 0.05% | 95-dB | Adhesion good. Substrate intact. |
| 0.06% | 97-dB | Adhesion good. Substrate intact. |
| 0.075% | 109-dB | Adhesion unacceptable. Substrate intact. |
| 0.10% | 107-dB | Adhesion poor. Substrate intact. |

Unexpectedly, in the presence of the pinene tackifier, NIREZ 1135, the erucamide provides excellent chill roll release in the 0.04–0.06 weight percent range. Although NIREZ 1135 is the most preferred tackifier the erucamide would perform synergistically with the other aforementioned tackifiers having the required RBSP.

EXAMPLE 4:

The 32-melt index polyethylene of Example 1 containing the tackifier was modified with four (4) levels of a fatty acid amide, stearyl erucamide. Each modification was extrusion coated to the same Kraft paper substrate at an extrudate temperature of 470° F. (243° C.). The following observations were noted:

| Stearyl Erucamide | Sound Level | Comments |
| --- | --- | --- |
| 0% | 108-dB | Stuck to Chill Roll at 650-fpm. Substrate ruptured internally. |
| 0.05% | 115-dB | Stuck to Chill Roll at 800-fpm. Substrate ruptured internally. |
| 0.10% | 115-dB | Stuck to Chill Roll at 800-fpm. Substrate ruptured internally. |
| 0.40% | 104-dB | No wrap of Chill Roll. Adhesion poor. Substrate intact. |

EXAMPLE 5:

Other fatty acid amides, specifically behenamide, oleamide, and stearamide were tested according to Example 4. Each of the fatty acid amides gave essentially identical results to those in Example 4. Under the same conditions shown above, they were no better than stearyl erucamide as chill roll release agents in the polyethylene system containing a tackifier.

This example shows that (1) while the 0.4 weight percent loading of stearyl erucamide may have imparted good processability to the polypropylene-tackifier system cited in U.S. Pat. No. 4,526,919, it failed to permit good adhesion in a polyethylene-based system; (2) stearyl erucamide and other fatty acid amides are inferior to erucamide as chill roll release agents for tackifier-modified polyethylene systems; and (3) one must be critically selective of the fatty acid amide, and its concentration, when it is used as a chill roll release agent for a tackifier-modified polyethylene system in extrusion coating.

EXAMPLE 6:

The 32-melt index polyethylene of Example 1 was modified with four (4) levels of a fatty acid salt, calcium stearate. Each modification was extrusion coated to the same Kraft paper substrate at an extrudate temperature of 470° F. (243° C.). The following observations were noted:

| Calcium Stearate | Sound Level | Comments |
| --- | --- | --- |
| 0% | 108-dB | Stuck to Chill Roll at 650-fpm. Substrate ruptured internally. |
| 0.05% | 113-dB | Stuck to Chill Roll at 800-fpm. Substrate ruptured internally. |
| 0.10% | 115-dB | Stuck to Chill Roll at 800-fpm. Substrate ruptured internally. |
| 0.50% | 112-dB | No wrap of Chill Roll. Adhesion poor. Substrate intact. |

This example shows that (1) fatty acid salts most likely do not provide good chill roll release for a polyethylene-based system, and (2) calcium stearate is inferior to erucamide as a chill roll release agent.

The graph in FIG. 1 shows the criticality and uniqueness of erucamide as a chill roll release agent for a polyethylene containing a tackifier used in extrusion coating.

We claim:

1. A process for the low-temperature extrusion coating of a substrate with a polyethylene film having a thickness of at least about 0.0075 mm, said process comprising:

applying a polyethylene extrusion coating composition to at least one surface of said substrate by extrusion coating at a temperature in the range of 175° to 290° C., said polyethylene extrusion coating composition comprising;

(a) a polyethylene component having a melt index in the range of about 2 to 100 dg per minute at 190° C. and having a sufficiently broad molecular weight distribution so that the resulting composition is capable of being extrusion coated at a temperature in the range of 175° C. to 290° C., (b) about 2 to 20 weight percent, based on the total weight, of a tackifying resin having a RBSP in the range of about 100° to 140° C., and (c) about 0.03 to 0.07 weight percent, based on the total weight of the fatty acid amide, erucamide.

2. The process according to claim 1 wherein the composition that is extrusion coated onto a substrate also contacts a chill roll and has a reduction in sound level at the chill roll release point of at least 5 decibels less, when compared to an identical process and composition except without the erucamide.

3. The process according to claim 2 wherein said reduction in sound level is 10 decibels less.

4. The process according to claim 3 wherein said reduction in sound level is at least 15 decibels less.

5. The process according to claim 1 wherein said substrate is selected from papers, paperboards, fibers, polymeric materials, and metal foils.

6. The article produced by the process of claim 5.

7. An article of manufacture comprising a substrate having adhered thereto a polyethylene composition comprising:

(a) a polyethylene component having a melt index in the range of about 2 up to 100 dg per minute at 190° C. and having a sufficiently broad molecular weight distribution so that the resulting composition is capable of being extrusion coated at a temperature in the range of 175° up to 290° C., (b) about 2 up to 20 weight percent of a tackifying resin having a RBSP in the range of about 100° up to 140° C., and (c) about 0.03 to 0.07 weight percent of the fatty acid amide, erucamide.

8. The process according to claim 1 wherein said temperature at which said polyethylene extrusion coating composition is applied to said substrate is in the range of 200° to 260° C.

9. The process according to claim 8 wherein said temperature is in the range of 240° to 250° C.

10. The process according to claim 1 wherein the polyethylene component of (a) is present at about 79.93 to 97.97 weight percent, based on the total weight of the polyethylene extrusion coating composition.

11. The process according to claim 1 wherein said polyethylene component (a) of said polyethylene extrusion coating composition has a melt index in the range of about 20 to 80 dg per minute and a poly dispersity index of at least 7.

12. The process according to claim 1 wherein said tackifying resin (b) of said polyethylene extrusion coating composition is present in the amount of about 7 to 15 weight percent and is selected from the group consisting of rosin ester resins and terpene polymers.

13. The process according to claim 12 wherein said tackifying resin is a polymerized beta-pinene.

14. The process according to claim 1 wherein said erucamide is present in said polyethylene extrusion coating composition at about 0.04 to 0.06 weight percent.

15. The process according to claim 14 wherein said erucamide is present in said polyethylene extrusion coating composition at about 0.05 weight percent.

16. The process according to claim 8 wherein said temperature is in the range of 200° to 250° C.

17. The article of manufacture according to claim 7 wherein said substrate is selected from papers, photographic papers, paperboards, fibers, polymeric materials, or metal foils.

* * * * *